United States Patent
Mehrabi et al.

(10) Patent No.: US 12,351,188 B2
(45) Date of Patent: Jul. 8, 2025

(54) REAL-TIME RELIABILITY ASSESSMENT METHOD TO ENHANCE ROBUSTNESS OF DATA-FUSION BASED VEHICLE SPEED ESTIMATION

(71) Applicant: GM Global Technology Operations LLC, Detroit, MI (US)

(72) Inventors: Naser Mehrabi, Richmond Hill (CA); Arash Hashemi, Waterloo (CA); Sresht Gurumoorthi Annadevara, Toronto (CA); Seyedalireza Kasaiezadeh Mahabadi, Novi, MI (US); Nauman Sohani, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 18/521,122

(22) Filed: Nov. 28, 2023

(65) Prior Publication Data
US 2025/0171031 A1 May 29, 2025

(51) Int. Cl.
*B60W 40/105* (2012.01)
*B60W 50/00* (2006.01)

(52) U.S. Cl.
CPC .......... *B60W 40/105* (2013.01); *B60W 50/00* (2013.01); *B60W 2050/0052* (2013.01); *B60W 2520/105* (2013.01); *B60W 2520/125* (2013.01); *B60W 2520/14* (2013.01); *B60W 2520/28* (2013.01); *B60W 2520/30* (2013.01)

(58) Field of Classification Search
None
See application file for complete search history.

(56) References Cited

U.S. PATENT DOCUMENTS

| | | | |
|---|---|---|---|
| 6,816,804 B1 * | 11/2004 | Lee | B60W 40/105 701/72 |
| 8,255,119 B2 * | 8/2012 | Komori | B60T 8/174 701/72 |
| 10,597,039 B2 * | 3/2020 | Milanese | B60W 40/068 |
| 10,733,510 B2 * | 8/2020 | Nageshrao | G06N 3/08 |
| 11,040,714 B2 * | 6/2021 | Natroshvili | G05D 1/0221 |
| 11,126,185 B2 * | 9/2021 | McGill, Jr. | G05D 1/0257 |

(Continued)

FOREIGN PATENT DOCUMENTS

| | | | | |
|---|---|---|---|---|
| CN | 101633359 A | * | 1/2010 | B60W 40/09 |
| CN | 101633359 B | * | 5/2013 | B60W 40/09 |

(Continued)

*Primary Examiner* — Kevin R Steckbauer
(74) *Attorney, Agent, or Firm* — Vivacqua Crane, PLLC

(57) ABSTRACT

A method for estimating a lateral velocity of a vehicle includes receiving sensor data from a sensor of the vehicle, determining a physics-based longitudinal velocity estimation of the vehicle using a physics-based model and the sensor data, determining a data-driven longitudinal velocity estimation of the vehicle using a first neural network and the sensor data, determining, using a second neural network, which of the physics-based longitudinal velocity estimation and the data-driven longitudinal velocity estimation is more reliable to determine a selected longitudinal velocity estimation, determining the lateral velocity of the vehicle using the selected longitudinal velocity estimation, and controlling the vehicle based on the lateral velocity.

20 Claims, 2 Drawing Sheets

(56) References Cited

U.S. PATENT DOCUMENTS

| | | | |
|---|---|---|---|
| 11,460,568 B2 * | 10/2022 | Bosse | G01S 13/505 |
| 11,872,994 B2 * | 1/2024 | Bosse | B60W 40/105 |
| 12,019,170 B1 * | 6/2024 | Xu | G01S 19/40 |
| 2008/0262677 A1 * | 10/2008 | Komori | B60W 40/103 |
| | | | 701/41 |
| 2019/0212453 A1 * | 7/2019 | Natroshvili | G06N 3/045 |
| 2020/0086861 A1 * | 3/2020 | McGill, Jr. | G05D 1/0214 |
| 2020/0101969 A1 * | 4/2020 | Natroshvili | B60W 60/00276 |
| 2020/0324781 A1 * | 10/2020 | Hayakawa | G06T 7/73 |
| 2021/0063560 A1 * | 3/2021 | Bosse | G01S 13/60 |
| 2023/0136325 A1 * | 5/2023 | Bosse | B60W 50/00 |
| | | | 701/93 |
| 2024/0001936 A1 * | 1/2024 | Yamamoto | B60T 8/172 |
| 2024/0051549 A1 * | 2/2024 | McGrory | B60W 40/105 |

FOREIGN PATENT DOCUMENTS

| | | | | |
|---|---|---|---|---|
| CN | 114216459 A | * | 3/2022 | G01C 21/165 |
| CN | 115220466 A | * | 10/2022 | G05D 1/0808 |
| CN | 115406446 A | * | 11/2022 | |
| CN | 115556755 A | * | 1/2023 | |
| CN | 116224407 A | * | 6/2023 | G01C 21/165 |
| CN | 116901970 A | * | 10/2023 | |
| CN | 117037118 A | * | 11/2023 | |
| CN | 117485369 A | * | 2/2024 | |
| CN | 118238847 A | * | 6/2024 | B60W 30/18163 |
| CN | 118333136 A | * | 7/2024 | B60W 40/105 |
| CN | 118238847 B | * | 8/2024 | B60W 30/18163 |
| CN | 118529025 A | * | 8/2024 | |
| CN | 119037423 A | * | 11/2024 | |
| CN | 118333136 B | * | 2/2025 | B60W 40/105 |
| CN | 115220466 B | * | 3/2025 | G05D 1/0808 |
| EP | 1982883 A1 | * | 10/2008 | B60T 8/172 |
| EP | 1982883 B1 | * | 3/2010 | B60T 8/172 |
| GB | 2614578 A | * | 7/2023 | B60W 10/20 |
| JP | 3474051 B2 | * | 12/2003 | |
| JP | 2008265461 A | * | 11/2008 | B60T 8/172 |
| JP | 2020169872 A | * | 10/2020 | B60W 30/04 |
| WO | WO-2022227460 A1 | * | 11/2022 | G06F 30/27 |
| WO | WO-2023166536 A1 | * | 9/2023 | |
| WO | WO-2024088508 A1 | * | 5/2024 | |

* cited by examiner

REAL-TIME RELIABILITY ASSESSMENT METHOD TO ENHANCE ROBUSTNESS OF DATA-FUSION BASED VEHICLE SPEED ESTIMATION

INTRODUCTION

The present disclosure relates to a system and method of real-time reliability assessment to enhance robustness of data-fusion-based vehicle speed estimation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In vehicles, the lateral velocity may be estimated using the longitudinal velocity. However, lateral velocities estimations for vehicles are sometimes unreliable because the longitudinal velocity estimations are unreliable. For this reason, it is desirable to develop a method and system to reliably determine lateral vehicle velocities.

SUMMARY

The present disclosure describes a method for estimating a lateral velocity of a vehicle. In an aspect of the present disclosure, the method includes receiving sensor data from a sensor of the vehicle, determining a physics-based longitudinal velocity estimation of the vehicle using a physics-based model and the sensor data, determining a data-driven longitudinal velocity estimation of the vehicle using a first neural network and the sensor data, determining, using a second neural network, which of the physics-based longitudinal velocity estimation and the data-driven longitudinal velocity estimation is more reliable to determine a selected longitudinal velocity estimation, determining, in real time, the lateral velocity of the vehicle using the selected longitudinal velocity estimation, and controlling the vehicle based on the lateral velocity. The method described in this paragraph improves vehicle technology by providing a more accurate estimation of the lateral vehicle velocity, thereby improving control of the vehicle.

In some aspect of the present disclosure, the sensor data includes a wheel speed of the vehicle, a longitudinal acceleration of the vehicle, a lateral acceleration of the vehicle, a yaw rate of the vehicle, a road wheel angle of the vehicle, and a wheel torque of the vehicle The first neural network may be a recurrent neural network or another suitable neural network. To determine which of the physics-based longitudinal velocity estimation and the data-driven longitudinal velocity estimation is more reliable, the method may include determining, using the second neural network, a reliability of the physics-based longitudinal velocity estimation, and determining, using the second neural network, a reliability of the data-driven longitudinal velocity estimation. The method may further include comparing the reliability of the physics-based longitudinal velocity estimation with the reliability of the data-driven longitudinal velocity estimation to determine which of the physics-based longitudinal velocity estimation and the data-driven longitudinal velocity estimation is more reliable. The method may include using a first extended Kalman filter to determine a final longitudinal velocity based on the selected longitudinal velocity estimation. The method may include comparing the reliability of the physics-based longitudinal velocity estimation with a predetermined reliability threshold to determine whether the reliability of the physics-based longitudinal velocity estimation is less than the predetermined reliability threshold, comparing the reliability of the data-driven longitudinal velocity estimation with the predetermined reliability threshold to determine whether the data-driven longitudinal velocity estimation is less than the predetermined reliability threshold, and increasing a covariance of the first extended Kalman filter in response to determining that the data-driven longitudinal velocity estimation and the physics-based longitudinal velocity estimation are both less than the predetermined reliability threshold. The method may include using a second extended Kalman filter to determine the lateral velocity of the vehicle based on the final longitudinal velocity that was previously determined using the first extended Kalman filter.

The present disclosure further describes a system of real-time reliability assessment to enhance robustness of data-fusion-based vehicle speed estimation. The system includes a plurality of sensors and a controller in communication with the sensors. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 2:
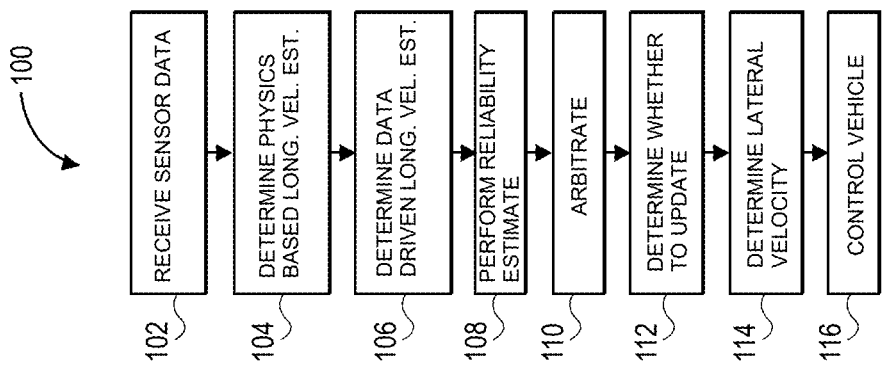
FIG. 2 is a method of real-time reliability assessment to enhance robustness of data-fusion-based vehicle speed estimation.

Reference will now be made in detail to several examples of the disclosure that are illustrated in accompanying drawings. Whenever possible, the same or similar reference numerals are used in the drawings and the description to refer to the same or like parts or steps.

Figure 1:
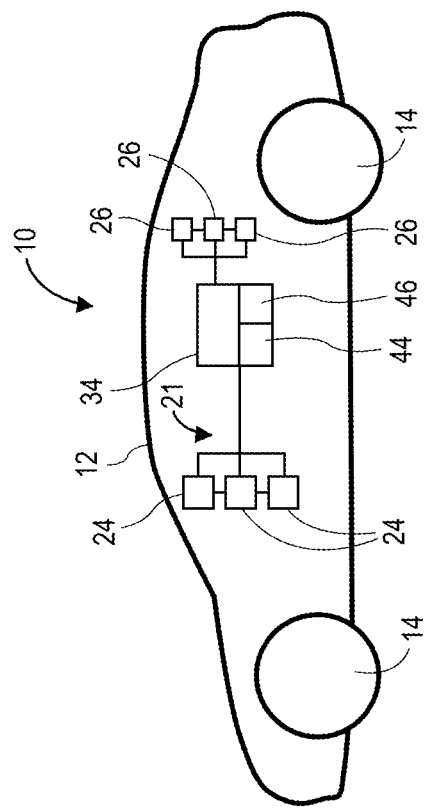
FIG. 1 is a schematic diagram of a vehicle including a system of real-time reliability assessment to enhance robustness of data-fusion-based vehicle speed estimation.

With reference to FIG. 1, a vehicle 10 generally includes a body 12 and a plurality of wheels 14 coupled to the body 12. The vehicle 10 may be an autonomous vehicle. In the depicted embodiment, the vehicle 10 is depicted in the illustrated embodiment as a sedan, but it should be appreciated that other vehicles including trucks, coupes, sport utility vehicles (SUVs), recreational vehicles (RVs), etc., may also be used.

The vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more radars, one or more Global Positioning System (GPS) transceivers, one or more inertial measurement units (IMUs), one or more accelerometers, one or more vehicle speed sensors, one or more wheel speed sensors, one or more yaw rate sensors, one or more gyroscopes, one or more proximity sensors, one or more cameras, one or more ultrasonic sensors, one or more thermal imaging sensors, and/or other sensors 24. Each sensor 24 is configured to generate a signal that is indicative of the sensed observable conditions (i.e., sensor data) of the exterior environment and/or the interior environment of the vehicle 10.

The vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 of the vehicle 10 may be programmed to execute the method 100 (FIG. 2) and the method 200 (FIG. 3) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10. The vehicle controller 34 is part of a system 21 for estimating the lateral velocity of the vehicle 10.

The vehicle 10 includes one or more actuator 26 that control one or more vehicle features such as, but not limited to, the propulsion system, the transmission system, the steering system, and the brake system of the vehicle 10. In various embodiments, the vehicle features may further include interior and/or exterior vehicle features such as, but are not limited to, doors, a trunk, and cabin features such as air, music, lighting, etc.

FIG. 2 is a flowchart of a method 100. The method 100 begins at block 102. At block 102, the vehicle controller 34 receives the sensor data from the sensors 24 of the vehicle 10 and/or estimations based on the sensor data. The sensor data my include, but is not limited to, the wheel speed of the vehicle 10, the yaw acceleration of the vehicle 10, the longitudinal acceleration of the vehicle 10, the lateral acceleration of the vehicle 10, the yaw rate of the vehicle 10, the road wheel angle of the vehicle 10, and/or the wheel torque of the vehicle 10. Then, the method 100 proceeds to block 104.

At block 104, the vehicle controller 34 determines a physics-based longitudinal velocity estimation of the vehicle 10 using a physics-based model and the sensor data from the sensors 24. To determine the physics-based longitudinal velocity estimation, the vehicle controller 34 may use the physics-based model that is described with the following equations:

$$\frac{d}{dt}\begin{bmatrix} v_x \\ v_y \\ \psi \\ \omega_z \end{bmatrix} = \begin{bmatrix} a_x + \omega_z v_y \\ a_y - \omega_z v_x \\ \omega_z \\ \dot{\omega}_z \end{bmatrix}$$

$$\begin{bmatrix} v_E^{GPS} \\ v_N^{GPS} \\ \gamma^{GPS} \\ \omega_z^{IMU} \\ \hat{v}_x^{VRVR} \end{bmatrix} = \begin{bmatrix} v_x \cos\psi - v_y \sin\psi - \omega_z(x_A \sin\psi + y_A \cos\psi) \\ v_x \sin\psi + v_y \cos\psi - \omega_z(-x_A \cos\psi + y_A \sin\psi) \\ \psi \\ \omega_z \\ v_x \end{bmatrix}$$

where:
$a_x$ is the longitudinal acceleration of the vehicle 10;
$a_y$ is the lateral acceleration of the vehicle 10;
$\dot{\omega}_z$ is the yaw acceleration of the vehicle 10;
$\omega_z$ is the yaw rate of the vehicle 10;
$v_x$ is the longitudinal velocity of the vehicle 10;
$v_y$ is the lateral velocity of the vehicle 10;
$\psi$ is the yaw angle of the vehicle 10;
$x_A$ is a position of the vehicle 10 relative to a horizontal axis;
$y_A$ is a position of the vehicle 10 relative to a vertical axis;
$v_E^{GPS}$ is a GPS velocity of the vehicle 10 in the East direction;
$v_N^{GPS}$ is a GPS velocity of the vehicle 10 in the North direction;
$\gamma^{GPS}$ is a GPS yaw angle of the vehicle 10;
$\omega_z^{IMU}$ is the yaw rate of the vehicle 10 determined by the GPS or IMU;
$\hat{v}_x^{VRVR}$ is the physics-based longitudinal velocity estimation of the vehicle 10.

In the physics-based model, the longitudinal acceleration, the lateral acceleration, and the yaw acceleration may serve as inputs. Further, the longitudinal acceleration and the lateral acceleration of the vehicle 10 are assumed to be gravity-compensated. Moreover, the course angle and the yaw angle are similar when the side slip of the vehicle is low (i.e., close to zero). After determining the physics-based longitudinal velocity estimation of the vehicle 10, the method 100 continues to block 106.

At block 106, the vehicle controller 34 uses a first neural network and the sensor data to determine a data-driven longitudinal velocity estimation of the vehicle 10. Because the data-driven longitudinal velocity estimation may only be used when the physics-based longitudinal velocity estimation is inaccurate, the first neural network may be small and computationally efficient. At block 106, the vehicle controller 34 receives certain inputs. As non-limiting examples, the inputs may include wheel speed, longitudinal acceleration, lateral acceleration, yaw rate, yaw acceleration, road wheel angle, and wheel torque of the vehicle 10. These inputs are in an input space. Then, the vehicle controller 34 employs a dimensionality reduction technique to transform the input dataset into a dataset of significantly fewer dimensions. As a non-limiting example, the vehicle controller 34 may use the Principal Component Analysis (PCA) for dimensionality reduction of the input dataset. The output of the Principal Component Analysis are principal components. The principal components are used as inputs in the first neural network. The first neural network then outputs the data-driven longitudinal velocity estimation of the vehicle 10. As non-limiting examples, the first neural network may be a recurrent neural network (RNN) or a nonlinear autoregressive network with exogenous inputs (NARX). The first neural network may be trained by first testing multiple input settings based on the network accuracy. Then, different networks are compared in terms of accuracy and interference time. Next, based on the selected network, the hyperparameters are tuned to have the most accuracy and least interference time. Then, the method 100 continues to block 108.

At block 108, the vehicle controller 34 performs a reliability assessment of the data-driven longitudinal velocity estimation and the physics-based longitudinal velocity estimation to which of the physics-based longitudinal velocity estimation and the data-driven longitudinal velocity estimation is more reliable. A second neural network may be used to predict the reliability of the data-driven longitudinal velocity estimation and the physics-based longitudinal velocity estimation. To train the second neural network, ground truth velocities of the vehicle 10 are measured using the sensors 24 (e.g., real time kinematics sensors). Then, the ground truth velocities are used to compute the error of the estimated velocities (i.e., the data-driven longitudinal velocity estimation and the physics-based longitudinal velocity estimation). The error may be determined using a weighted error function as follows:

$$E_W = (w)E_A + (1-w)E_r$$

$E_w$ is the weighted error;
w is a sigmoidal weighting function;
$E_A$ is the absolute error between the ground truth and estimated velocities;
$E_r$ is the relative error between the ground truth and estimated velocities.

The weighted error is computed for all data points and is used as a target variable for the velocity reliability assessment. After selecting possible input features, dimensionality reduction technique, such as PCA, is used to reduce the input space and the complexity of the neural network model. Multiple neural networks are trained with the new set of input features and the weighted error as the target variable. The best performing regressor (i.e., network) is then used to predict the error of the velocity estimations. A high error is indicative of a lower reliability, and a low error is indicative of higher reliability. Then, the method 100 proceeds to block 110.

At block 110, the vehicle controller 34 arbitrates between the data-driven longitudinal velocity estimation and the physics-based longitudinal velocity estimation. Specifically, the vehicle controller 34 selects the velocity estimation between data-driven longitudinal velocity estimation and the physics-based longitudinal velocity estimation that is most reliable. The most reliable velocity estimation may be referred to as the selected longitudinal velocity estimation. Then, the method 100 proceeds to block 112.

At block 112, the vehicle controller 34 determines whether to update (e.g., increase) a covariance of a first extended Kalman filter online based on the reliabilities of the data-driven longitudinal velocity estimation and the physics-based longitudinal velocity estimation as described in detail below. Regardless of whether the covariance is fixed or updated, the selected longitudinal velocity estimation is fed into the first extended Kalman filter to determine a final longitudinal velocity. The method 100 then proceeds to block 114.

At block 114, the vehicle controller 34 uses a second extended Kalman filter to determine the lateral velocity of the vehicle 10 based on the final longitudinal velocity that was previously determined using the first extended Kalman filter. The method 100 then proceeds to block 116.

At block 116, the vehicle controller 34 controls the vehicle 10 using the previously determined lateral velocity. As non-limiting examples, the vehicle controller 34 may adjust the torques of one or more actuators 26 (e.g., an electric motor, internal combustion engine) and/or actuates other actuators 26 (e.g., electronic limited slip differential (eLSD) and aerodynamic elements) based on the lateral velocity previously determined at block 114.

Figure 3:
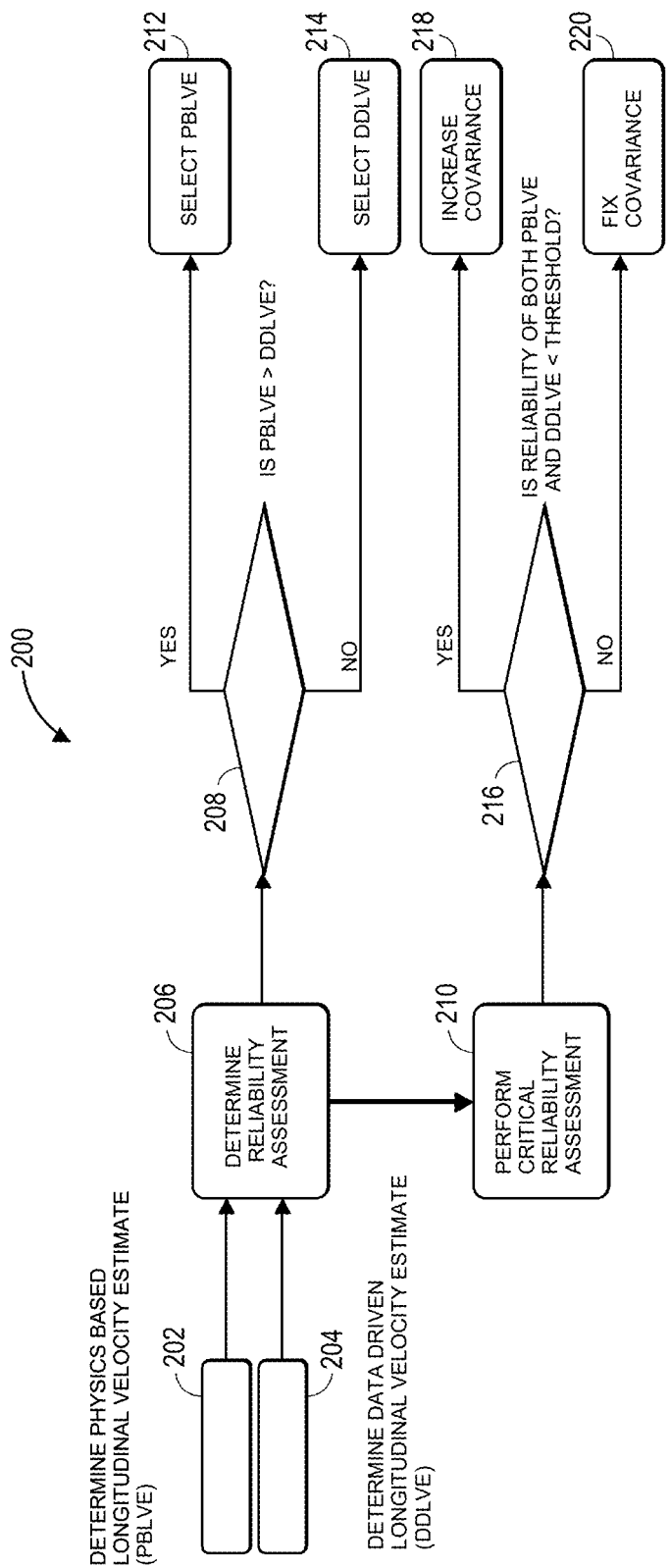
FIG. 3 is a method for longitudinal velocity arbitration and covariance online adaptation.

FIG. 3 is a flowchart of a method 200 for longitudinal velocity arbitration and covariance online adaptation. The method 200 begins at block 202 and block 204. At block 202, the vehicle controller 34 determines the physics-based longitudinal velocity estimation as discussed above. At block 204, the vehicle controller 34 determines the data-driven longitudinal velocity estimation as discussed above. Then, the method 100 continues to block 206. At block 206, the vehicle controller 34 determines a reliability assessment of the physics-based longitudinal velocity estimation and the data-driven longitudinal velocity estimation as discussed above. Next, the method 100 proceeds to block 208 and block 210.

At block 208, the vehicle controller 34 compares the reliability of the physics-based longitudinal velocity estimation with the reliability of the data-driven longitudinal velocity estimation to determine which of the physics-based longitudinal velocity estimation and the data-driven longitudinal velocity estimation is more reliable. If the reliability of the physics-based longitudinal velocity estimation is greater than the reliability of the data-driven longitudinal velocity estimation, then the method 200 proceeds to block 212. At block 212, the vehicle controller 34 selects the physics-based longitudinal velocity estimation as the longitudinal velocity to be used to determine the lateral velocity of the vehicle 10. If the reliability of the data-driven longitudinal velocity estimation is greater than the reliability of the physics-based longitudinal velocity estimation, then method 200 continues to block 214. At block 214, the vehicle controller 34 selects the data-driven longitudinal velocity estimation as the as the longitudinal velocity to be used to determine the lateral velocity of the vehicle 10.

At block 210, the vehicle controller 34 performs a critical reliability assessment. The critical reliability assessment entails comparing each of the physics-based longitudinal velocity estimation and the data-driven longitudinal velocity estimation with a predetermined reliability threshold. Next, the method 200 proceeds to block 216. At block 216, the vehicle controller 34 determines whether both the physics-based longitudinal velocity estimation and the data-driven longitudinal velocity estimation are unreliable. Specifically, if the reliability of the of the data-driven longitudinal velocity estimation and the reliability of the physics-based longitudinal velocity estimation are both less than the predetermined reliability threshold, then the method 200 continues to block 218. At block 218, the vehicle controller 34 increase, in real-time, a covariance of the first extended Kalman filter. If the reliability of the of the data-driven longitudinal velocity estimation and/or the reliability of the physics-based longitudinal velocity estimation are equal to or greater than the predetermined reliability threshold, then the method 200 continues to block 220. At block 220, the vehicle controller 34 fixes the covariance of the first extended Kalman filter. In other words, the covariance of the first extended Kalman filter remains the same.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve de sired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for estimating a lateral velocity of a vehicle, comprising:
    receiving sensor data from a sensor of the vehicle;
    determining a physics-based longitudinal velocity estimation of the vehicle using a physics-based model and the sensor data;
    determining a data-driven longitudinal velocity estimation of the vehicle using a first neural network and the sensor data;
    determining, using a second neural network, which of the physics-based longitudinal velocity estimation and the data-driven longitudinal velocity estimation is more reliable to determine a selected longitudinal velocity estimation;
    determining, in real-time, the lateral velocity of the vehicle using the selected longitudinal velocity estimation; and
    controlling the vehicle based on the lateral velocity.

2. The method of claim 1, wherein the sensor data includes a wheel speed of the vehicle, a longitudinal acceleration of the vehicle, a lateral acceleration of the vehicle, a yaw rate of the vehicle, a road wheel angle of the vehicle, and a wheel torque of the vehicle, and the first neural network is a recurrent neural network.

3. The method of claim 2, wherein determining, using the second neural network, which of the physics-based longitudinal velocity estimation and the data-driven longitudinal velocity estimation is more reliable includes:
determining, using the second neural network, a reliability of the physics-based longitudinal velocity estimation; and
determining, using the second neural network, a reliability of the data-driven longitudinal velocity estimation.

4. The method of claim 3, further comprising comparing the reliability of the physics-based longitudinal velocity estimation with the reliability of the data-driven longitudinal velocity estimation to determine which of the physics-based longitudinal velocity estimation and the data-driven longitudinal velocity estimation is more reliable.

5. The method of claim 4, further comprising using a first extended Kalman filter to determine a final longitudinal velocity based on the selected longitudinal velocity estimation.

6. The method of claim 5, further comprising:
comparing the reliability of the physics-based longitudinal velocity estimation with a predetermined reliability threshold to determine whether the reliability of the physics-based longitudinal velocity estimation is less than the predetermined reliability threshold;
comparing the reliability of the data-driven longitudinal velocity estimation with the predetermined reliability threshold to determine whether the reliability of the data-driven longitudinal velocity estimation is less than the predetermined reliability threshold; and
increasing a covariance of the first extended Kalman filter in response to determining that the reliability of the of the data-driven longitudinal velocity estimation and the reliability of the physics-based longitudinal velocity estimation are both less than the predetermined reliability threshold.

7. The method of claim 6, further comprising using a second extended Kalman filter to determine the lateral velocity of the vehicle based on the final longitudinal velocity that was previously determined using the first extended Kalman filter.

8. A system estimating a lateral velocity of a vehicle, comprising:
a plurality of sensors, wherein each of the plurality of sensors is configured to generate sensor data;
a controller in communication with the plurality of sensors, wherein the controller is programmed to:
receive the sensor data from the plurality of sensors of the vehicle;
determine a physics-based longitudinal velocity estimation of the vehicle using a physics-based model and the sensor data;
determine a data-driven longitudinal velocity estimation of the vehicle using a first neural network and the sensor data;
determine, using a second neural network, which of the physics-based longitudinal velocity estimation and the data-driven longitudinal velocity estimation is more reliable to determine a selected longitudinal velocity estimation;
determine the lateral velocity of the vehicle using the selected longitudinal velocity estimation; and
control the vehicle based on the lateral velocity.

9. The system of claim 8, wherein the sensor data includes a wheel speed of the vehicle, a longitudinal acceleration of the vehicle, a lateral acceleration of the vehicle, a yaw rate of the vehicle, a road wheel angle of the vehicle, and a wheel torque of the vehicle, and the first neural network is a recurrent neural network.

10. The system of claim 9, wherein the controller is programmed to:
determine, using the second neural network, a reliability of the physics-based longitudinal velocity estimation; and
determine, using the second neural network, a reliability of the data-driven longitudinal velocity estimation.

11. The system of claim 10, wherein the controller is programmed to compare the reliability of the physics-based longitudinal velocity estimation with the reliability of the data-driven longitudinal velocity estimation to determine which of the physics-based longitudinal velocity estimation and the data-driven longitudinal velocity estimation is more reliable.

12. The system of claim 11, wherein the controller is programmed to use a first extended Kalman filter to determine a final longitudinal velocity based on the selected longitudinal velocity estimation.

13. The system of claim 12, wherein the controller is programmed to:
compare the reliability of the physics-based longitudinal velocity estimation with a predetermined reliability threshold to determine whether the reliability of the physics-based longitudinal velocity estimation is less than the predetermined reliability threshold;
compare the reliability of the data-driven longitudinal velocity estimation with the predetermined reliability threshold to determine whether the reliability of the data-driven longitudinal velocity estimation is less than the predetermined reliability threshold; and
increase a covariance of the first extended Kalman filter in response to determining that the reliability of the data-driven longitudinal velocity estimation and the reliability of the physics-based longitudinal velocity estimation are both less than the predetermined reliability threshold.

14. The system of claim 13, wherein the controller is programmed to use a second extended Kalman filter to determine the lateral velocity of the vehicle based on the final longitudinal velocity that was previously determined using the first extended Kalman filter.

15. A tangible, non-transitory, machine-readable medium, comprising machine-readable instructions, that when executed by a processor, cause the processor to:
receive sensor data from a plurality of sensors of a vehicle;
determine a physics-based longitudinal velocity estimation of the vehicle using a physics-based model and the sensor data;
determine a data-driven longitudinal velocity estimation of the vehicle using a first neural network and the sensor data;
determine, using a second neural network, which of the physics-based longitudinal velocity estimation and the data-driven longitudinal velocity estimation is more reliable to determine a selected longitudinal velocity estimation;
determine a lateral velocity of the vehicle using the selected longitudinal velocity estimation; and
control the vehicle based on the lateral velocity.

16. The tangible, non-transitory, machine-readable medium of claim 15, wherein the sensor data includes a wheel speed of the vehicle, a longitudinal acceleration of the vehicle, a lateral acceleration of the vehicle, a yaw rate of the vehicle, a road wheel angle of the vehicle, and a wheel torque of the vehicle, and the first neural network is a recurrent neural network.

17. The tangible, non-transitory, machine-readable medium of claim 16, wherein the tangible, non-transitory, machine-readable medium further comprising machine-readable instructions, that when executed by the processor, causes the processor to:
determine, using the second neural network, a reliability of the physics-based longitudinal velocity estimation; and
determine, using the second neural network, a reliability of the data-driven longitudinal velocity estimation.

18. The tangible, non-transitory, machine-readable medium of claim 17, wherein the tangible, non-transitory, machine-readable medium further comprising machine-readable instructions, that when executed by the processor, causes the processor to compare the reliability of the physics-based longitudinal velocity estimation with the reliability of the data-driven longitudinal velocity estimation to determine which of the physics-based longitudinal velocity estimation and the data-driven longitudinal velocity estimation is more reliable.

19. The tangible, non-transitory, machine-readable medium of claim 18, wherein the tangible, non-transitory, machine-readable medium further comprising machine-readable instructions, that when executed by the processor, causes the processor to use a first extended Kalman filter to determine a final longitudinal velocity based on the selected longitudinal velocity estimation.

20. The tangible, non-transitory, machine-readable medium of claim 19, wherein the tangible, non-transitory, machine-readable medium further comprising machine-readable instructions, that when executed by the processor, causes the processor to:
compare the reliability of the physics-based longitudinal velocity estimation with a predetermined reliability threshold to determine whether the reliability of the physics-based longitudinal velocity estimation is less than the predetermined reliability threshold;
compare the reliability of the data-driven longitudinal velocity estimation with the predetermined reliability threshold to determine whether the reliability of the data-driven longitudinal velocity estimation is less than the predetermined reliability threshold; and
increase a covariance of the first extended Kalman filter in response to determining that the reliability of the data-driven longitudinal velocity estimation and the reliability of the physics-based longitudinal velocity estimation are both less than the predetermined reliability threshold.

\* \* \* \* \*